UNITED STATES PATENT OFFICE.

HENRY GARRISON AND GEO. GARRISON, OF NEWBURG, NEW YORK.

IMPROVEMENT IN SUGAR-CANDY.

Specification forming part of Letters Patent No. 3,534, dated April 10, 1844.

*To all whom it may concern:*

Be it known that we, HENRY GARRISON and GEORGE GARRISON, of Newburg, Orange county, State of New York, have invented a new composition for promoting and preserving health, and for the cure of coughs, colds, asthma, and all other pulmonary affections leading to consumption, and called "Garrison's Compound Balsam of Liverwort Candy;" and we do hereby declare that the following is a full and exact description.

The nature of our invention consists in the compounding and mixing certain articles together with sugar, making a candy which is at the same time useful and palatable, and has proved beneficial in the several cases where it has been tried for coughs, colds, and primary stages of consumption.

To enable others skilled in the art to make and use our invention, we will proceed to describe the particular parts of our composition.

Of sugar, one hundred and eight parts; of extract of sarsaparilla, five parts; of extract of liverwort, four parts; of extract of thoroughwort, five parts; of extract of hoarhound, eight parts; of extract of olive oil, one part, the whole being thoroughly mixed and boiled until it becomes of sufficient consistency to form a candy. The above description of parts may be taken in measure which will most suit the convenience of the manufacturer. This, however, is given in ounces, being the smallest measure for which a full and accurate description could be given.

What we claim as our invention, and desire to secure by Letters Patent, is—

The compounding and mixing the above articles, and the same forming the article known as "Garrison's Compound Balsam of Liverwort Candy," as is hereinbefore described.

HENRY GARRISON.
GEORGE GARRISON.

Witnesses:
ISAIAH IRVIN,
C. F. BELKNAP.